United States Patent [19]

Entenmann et al.

[11] Patent Number: 4,996,705

[45] Date of Patent: Feb. 26, 1991

[54] USE OF TELECOMMUNICATIONS SYSTEMS FOR LOTTERIES

[75] Inventors: John K. Entenmann, Glendale Heights, Ill.; John A. Hooke, Rumson, N.J.; Eric E. Kampmeier, Naperville; Barry L. Posterick, Batavia, both of Ill.

[73] Assignee: AT&T Bell Laboratories, Murray Hill, N.J.

[21] Appl. No.: 91,621

[22] Filed: Sep. 1, 1987

[51] Int. Cl.$^5$ .................. H04M 11/00; G06F 15/28; G06F 15/20
[52] U.S. Cl. .......................... 379/91; 379/89; 379/104; 364/412; 235/375; 902/23
[58] Field of Search ............... 364/412; 235/381, 380, 235/383, 375; 379/104, 88, 89, 93, 91; 902/23

[56] References Cited

U.S. PATENT DOCUMENTS

| | | | |
|---|---|---|---|
| 3,920,908 | 11/1975 | Kraus | 379/91 |
| 4,489,439 | 12/1984 | Hughes | 381/51 |
| 4,494,197 | 1/1985 | Troy et al. | 364/412 |
| 4,503,288 | 3/1985 | Kessler | 379/67 |
| 4,525,712 | 6/1985 | Okano et al. | 340/825.31 |
| 4,559,415 | 12/1985 | Bernard | 379/91 |
| 4,679,143 | 7/1987 | Hagiwara | 364/412 |
| 4,692,863 | 9/1987 | Moosz | 364/412 |
| 4,697,282 | 9/1987 | Winter et al. | 379/67 |
| 4,792,968 | 12/1988 | Katz | 379/92 |

FOREIGN PATENT DOCUMENTS

| | | | |
|---|---|---|---|
| 1162336 | 2/1984 | Canada | 379/93 |
| 0178572 | 10/1984 | Japan | 364/412 |
| 0126764 | 7/1985 | Japan | 364/412 |
| 0953645 | 8/1982 | U.S.S.R. | 364/412 |

OTHER PUBLICATIONS

Ozawa et al., "Voice Response System and Its Applications", *Hitachi Review*, vol. 28, No. 6, Dec. 1979, pp. 301-305.
S. L. Dunik, "Large Scale Off-Track Betting Systems", *Computer*, vol. 7, No. 10, Oct. 1974, pp. 30-38.

Primary Examiner—Jin F. Ng
Assistant Examiner—Wing F. Chan
Attorney, Agent, or Firm—W. Ulrich

[57] ABSTRACT

A lottery system using a public switched network to enter a lottery and to receive an indication of winning while connected on a lottery call. A lottery customer dials a telephone number to enter the lottery. The customer has his eligibility verified by a credit card number or the telephone number of the calling station. The customer is then prompted to speak or key a lottery entry which may be a full number, partial number, or an indication that a lottery comparison number is to be generated by a lottery processor. From the customer's lottery entry, a lottery comparison number is generated. This is compared with a random lottery target number generated by the lottery processor. If the comparison number and target number match, the customer is informed of his winning. Advantageously, lottery customers are quickly notified of their winnings.

2 Claims, 3 Drawing Sheets

USE OF TELECOMMUNICATIONS SYSTEMS FOR LOTTERIES

TECHNICAL FIELD

This invention deals with arrangements and methods for conducting lotteries and more specifically with lottery arrangements and methods using telecommunications systems to communicate between customers and a centralized lottery system.

PROBLEM

State run lotteries have become increasingly popular in the past several decades. In these lotteries, the players typically select a group of numbers from a much larger group of possible numbers and pay for each selection. For example, for each drawing of the lottery, the Illinois State Lottery allows its players to select any two combinations of 6 numbers from 1–44 for a charge of $1.00. The winner(s) of the lottery are the person(s) who have selected all six numbers correctly for that drawing.

Compared with other gambling activities, a lottery has the disadvantage that a selection must generally be made long before results are obtained and announced. For example, the Illinois Lottery "Lotto" game has two drawings per week. A bettor can only purchase tickets at least ten minutes and up to three days before each drawing, and must wait until the drawing to find out whether he has won. Only by entering the lottery at a time close to the time of the twice-weekly drawing can a customer get results in a fairly short time. This is in contrast to other gambling activities, such as a roulette wheel or dice, where the bettor learns results momentarily. A problem of the prior art of lottery systems therefore is that no facilities are available for providing a bettor with mechanized immediate results on his lottery bet, particularly over telecommunications facilities.

SOLUTION

The above problem is solved and an advance is made in lottery systems in accordance with one exemplary embodiment of the invention, wherein a lottery player communicates via a telecommunications link with a centralized lottery administration system, communicates a selection to that system over a telecommunications link, and, in a departure from the prior art, has that selection or a number based on that selection compared with a random number generated in the lottery system while the player is still on line. If the result of the comparison indicates a winning lottery entry, the lottery player is informed that the player has won a prize.

BRIEF DESCRIPTION OF THE DRAWING

The invention can be understood from the following detailed description when read with reference to the drawing in which.

DETAILED DESCRIPTION

Figure 1:
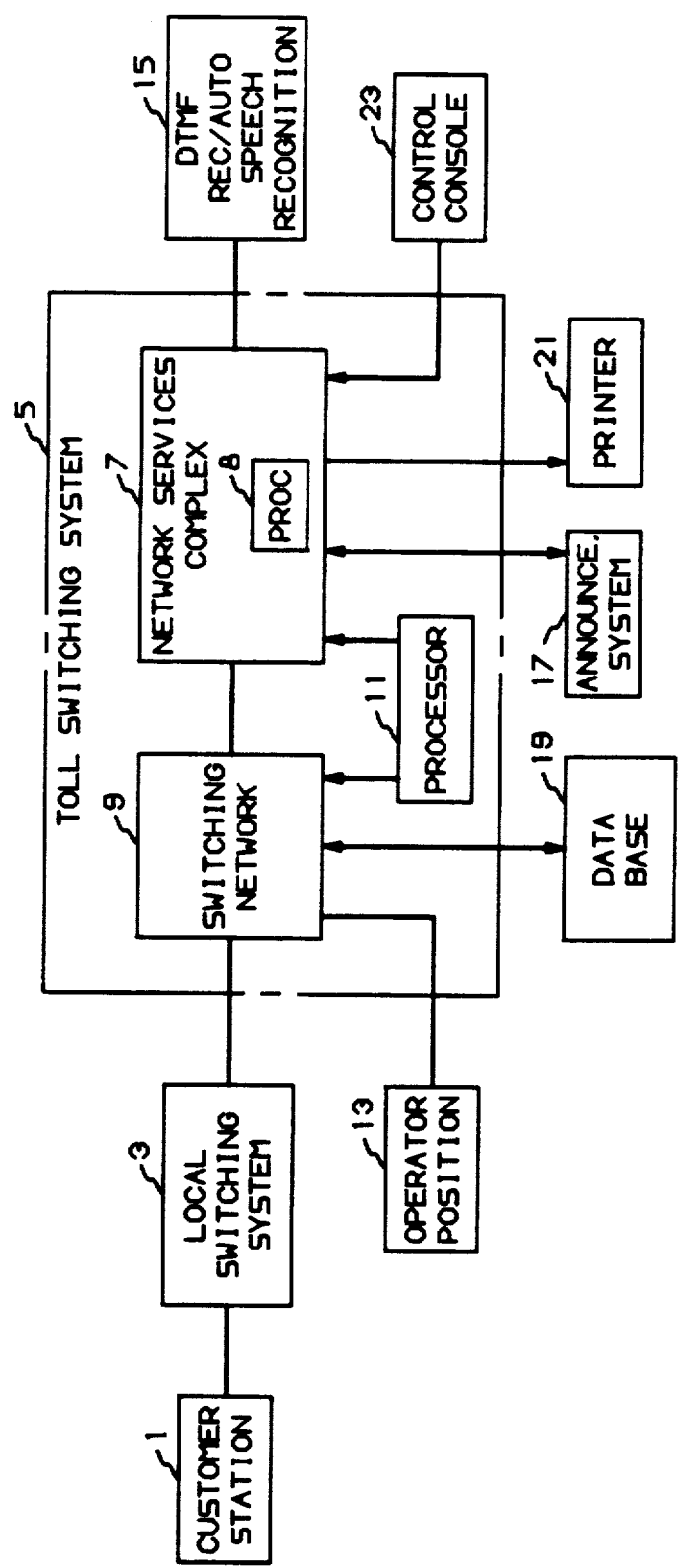
FIG. 1 is a block diagram of a system for practicing the invention.

FIG. 1 is a block diagram of a system for providing customer paid lottery or sponsor paid lottery services. A customer at customer station 1 is connected via a local switching system 3 to a toll switching system 5. The local switching system may be, for example, a 1A ESS¹ switch, described in "No. 1 Electronic Switching System", *Bell System Technical Journal*, Vol. 43, No. 5, pp. 1831–2592, September 1964, and "1A Processor", *Bell System Technical Journal*, Vol. 56, No. 2, pp. 119–315, February 1977. In order to be able to process calls without requiring credit card or equivalent data, it is desirable that the local switching system be capable of identifying the telephone number of a customer and forwarding this number to a toll switching system, i.e., capable of performing the automatic number identification (ANI) function. In this embodiment, the local switching system is connected to a toll switching system which may, for example, be the 4 ESS switch described in "No. 4 ESS", *Bell System Technical Journal*, Vol. 56, No. 7, pp. 1015–1320, September 1977, and "No. 4 ESS", *Bell System Technical Journal*, Vol. 60, No. 6, pp. 1041–1224, July-August 1981. In other embodiments, the functions described herein for the toll switch may be performed by a tandem switching system or the customer's local switching system. In the 4 ESS switch the customer is connected through switching network 9 to a network services complex 7. This connection is set up under the control of a processor system 11. The network services complex has its own processor 8 and is connectable to a voice processing unit 15 comprising a combined dual tone multifrequency (DTMF) receiver/speech recognition unit. The DTMF receiver detects DTMF keyed signals, the speech recognition unit recognizes spoken digits. The network services complex also includes an announcement system 17 for prompting customers and for delivering an advertising message for sponsor paid lotteries. Data base 19, connected via the switching network 9, is used for maintaining customer eligibility data for a lottery and for accumulating billing data for customers of a customer paid lottery. This data base is accessed prior to accepting a lottery call and prior to prompting a customer to enter lottery data. The data base can alternatively be accessed via the network services complex 7. A printer 21 is used to record major events, for example, the winning of a prize by a customer. Control console 23 is used to generate and enter control information into control processor 8 for varying the probability of winning a prize, for example, by extending or narrowing the range of target random numbers, and for varying the amount of the payoff, and for controlling these factors for a plurality of lotteries controlled by the same complex.

Figure 2:
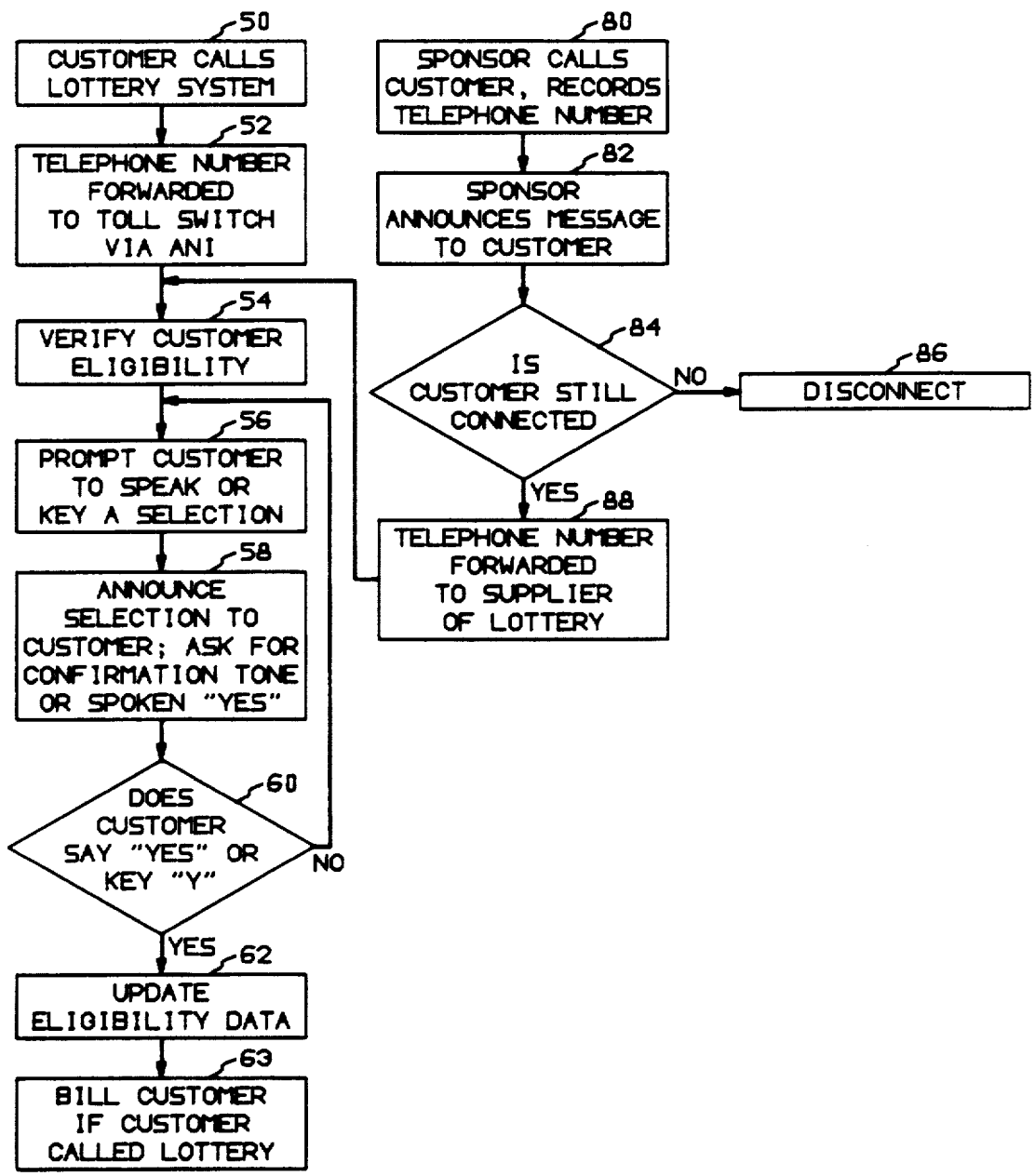
FIGS. 2 and 3 are flow diagrams of steps for processing customer lottery calls.
Figure 3:
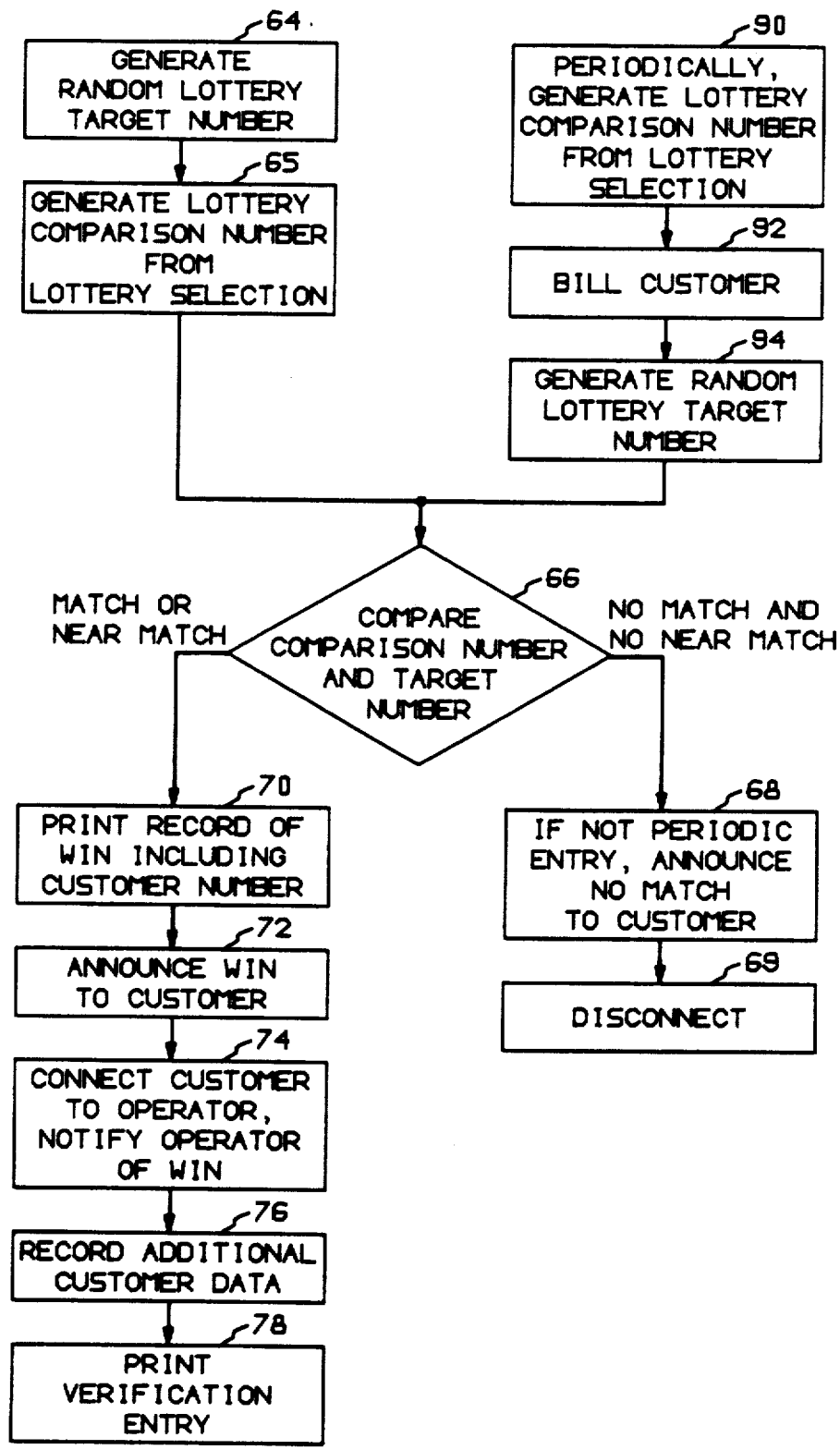

FIGS. 2 and 3 are flow diagrams of a method of offering both customer paid and sponsor paid lotteries. Action box 50 (FIG. 2) represents the customer dialing a code to access the lottery. This code may be the code of a customer paid lottery or it may be the code of an advertisement. The customer's telephone number is forwarded to the toll switching system using automatic number identification (action box 52). The data base 19 is then used to verify the eligibility of the customer for the specific lottery (action box 54). This eligibility may be based on locale in the case of either a customer paid or a sponsor paid lottery since a customer paid lottery may not be legal in certain areas and a sponsor may not be interested in receiving inquiries from certain areas. Alternatively, a customer could supply a credit card number and eligibility, charges, and winnings could be referred to that credit card account. The data base is used to verify a particular customer's eligibility and to record charges: for the sponsor paid lottery a particular customer may be eligible only for a limited number of chances; for the customer paid lottery it is important to keep a record of how many times a customer has used the lottery to ensure that a prepaid amount or a credit limit is not exceeded. If a sponsor does not demand a limitation on the use of the lottery by a customer, the customer's directory number is not needed and can be obtained in case of a win by an operator attached to the call at that time.

Next, a customer is prompted to key or speak a lottery selection to be used for generating that customer's lottery comparison number (action box 56). This lottery selection can be a full lottery comparison number, a partial lottery comparison number, or an indication that the data base is to generate the lottery comparison number, either specifically or as a default condition. In the case of sponsor paid lotteries, this prompting may follow earlier announcements in which the sponsor delivers an advertisement and perhaps seeks marketing information by requesting a customer to speak or key digits or the words "yes" or "no". Such information would be detected by DTMF receiver/speech recognition unit 15. The keyed or spoken lottery selection is announced back to the customer (action box 58). If the customer fails to key or speak a go-ahead signal (test 60 "no" output) then the customer is reprompted to key or speak the lottery number. If the customer does key or speak a go-ahead signal ("yes" output of test 60) then billing data is entered for the customer of a customer paid lottery; eligibility data for that customer is also updated (action box 62) to reflect the fact that the customer has used the lottery once more. If this is a sponsor paid lottery, eligibility data is updated to prevent any specific customer from overusing the service. If this is a customer paid lottery entry, the customer is billed (action box 63).

FIG. 3 illustrates one method of determining whether the lottery entry represents a winning entry. Control processor 8 generates a lottery target random number (action box 64) which is compared (test 66) with a lottery comparison number generated (action box 65) from the lottery selection. The lottery target number could also be generated by another processor under the control of the sponsor or the administrator of a lottery, which telephone number control processor 8 would then compare with a lottery comparison number. Note that the customer need not key or speak a full number, although this is an option if marketing tests show the full number entry is preferred. For example, the customer may key or speak the first four digits of a ten digit random number and the control processor 8 will generate a random number for the last six digits. The lottery comparison number generated from the customer's selection data and the random lottery target number generated by the processor for comparison are compared in test 66. If there is no match or no near match, the customer is informed (action box 68) through an announcement and the call is disconnected (action box 69). If there is a match or near match (for example, a match of all but one number), a record is immediately printed on the printer 21 so that even if the call for some reason is interrupted a retrievable record is available and the customer can be called back (action box 70). In the normal situation, the win is then announced to the customer by announcement (action box 72) and the customer is connected to an operator (action box 74). The operator records additional customer data supplied by the customer such as the address and name (action box 76) and a verification entry is printed on printer 21 (action box 78) to verify that an operator has recorded this data. The lottery entry can also be arranged to be tried periodically, say, every month. A lottery comparison number is generated (action box 90) and the customer billed (action box 92). The random lottery target number is generated (action box 94) and the comparison made (test 66, previously described.) If the lottery entry is periodic, there is no need to need to announce the absence of a winning entry to the customer (action box 68). If the customer has won, it is necessary to initiate a call to the customer to announce the win as described with respect to action box 72, since the customer is not connected on a periodic lottery entry.

FIG. 2 also illustrates the steps for processing a call generated by a sponsor. Unsolicited computer-generated calls very frequently encounter an almost immediate disconnect by the called customer. In order to induce the customer to hang on, perhaps in order to receive marketing information or to get a customer purchase order, in accordance with the principles of this invention, an announcement is played promising the customer that if the customer does not disconnect, the customer will be given a chance to win a lottery prize. Such a call is generated and the customer number of the call is recorded (action box 90). The sponsor's message is announced to the customer (action box 92). Next, a test is made whether the customer is still connected (test 94). If not, the call is disconnected (action box 86). If the customer is still connected, the telephone number of the customer is forwarded to the supplier of the lottery and the steps from action box 54 on described supra with respect to customer generated calls are performed. Alternatively, the lottery service can be provided directly by the same equipment which is generating the calls and messages to customers as discussed with respect to action box 90 and 92. Alternatively, the system can be used for calls initiated by customers to a sponsor supplied message.

It is to be understood that the above description is only of one preferred embodiment of the invention. Numerous other arrangements may be devised by one skilled in the art without departing from the spirit and scope of the invention. The invention is thus limited only as defined in the accompanying claims.

What is claimed is:

1. Telemarketing apparatus, comprising:
  means connectable to a switched common carrier network for requesting a connection over said network to a telephone station;
  announcement means, responsive to a continuance of a call-in-progress signal from said telephone station, for announcing a telemarketing message and a lottery prompt to said telephone station;
  means for receiving information signals over said connection from said telephone station, said information signals representing data for a lottery entry;
  processing means for determining whether said data for said lottery entry represents a winning entry, said processing means comprising means for determining a lottery target number, means for processing said information signals for said lottery entry to form a lottery comparison number, and means for matching said lottery target number and said lottery comparison number to determine whether said lottery entry is a winning entry;
  said announcement means further for notifying a customer at said telephone station of the winning entry.

2. The apparatus of claim 1 wherein said means for processing said information signals is responsive only to information signals received after completion of announcement of said telemarketing message.

* * * * *